United States Patent
Aurongzeb et al.

(10) Patent No.: US 9,952,627 B2
(45) Date of Patent: Apr. 24, 2018

(54) FOLDING COMPUTING DEVICE WITH BENDING DISPLAY

(71) Applicant: DELL PRODUCTS, LP, Round Rock, TX (US)

(72) Inventors: Deeder M. Aurongzeb, Austin, TX (US); Jung-Hwan Hong, Austin, TX (US); John Trevor Morrison, Round Rock, TX (US); Brian H. Leonard, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 15 days.

(21) Appl. No.: 15/139,850

(22) Filed: Apr. 27, 2016

(65) Prior Publication Data

US 2017/0315588 A1 Nov. 2, 2017

(51) Int. Cl.
*G06F 1/16* (2006.01)

(52) U.S. Cl.
CPC .......... *G06F 1/1652* (2013.01); *G06F 1/1601* (2013.01); *G06F 1/1616* (2013.01)

(58) Field of Classification Search
CPC .................................................. G06F 1/1652
See application file for complete search history.

(56) References Cited

U.S. PATENT DOCUMENTS

| 6,577,496 | B1* | 6/2003 | Gioscia ................. | G06F 1/1616 345/156 |
|---|---|---|---|---|
| 8,237,165 | B2 | 8/2012 | Kim et al. | |
| 8,271,047 | B2 | 9/2012 | Kim et al. | |
| 8,723,890 | B2 | 3/2014 | Griffin et al. | |
| 9,201,464 | B2 | 12/2015 | Uchiyama et al. | |
| 2006/0050169 | A1* | 3/2006 | Misawa ................. | G06F 1/1616 348/333.06 |
| 2006/0146488 | A1* | 7/2006 | Kimmel ................. | G06F 1/1616 361/679.04 |
| 2012/0002360 | A1* | 1/2012 | Seo ........................ | G06F 1/1616 361/679.01 |
| 2012/0236484 | A1* | 9/2012 | Miyake ................. | G06F 1/1616 361/679.01 |
| 2012/0307423 | A1* | 12/2012 | Bohn .................... | G06F 1/1641 361/679.01 |
| 2013/0010405 | A1* | 1/2013 | Rothkopf ............ | H04M 1/0216 361/679.01 |
| 2013/0021762 | A1* | 1/2013 | van Dijk ............... | G06F 1/1652 361/749 |
| 2013/0321987 | A1* | 12/2013 | Ore Yang .............. | G06F 1/1628 361/679.01 |

(Continued)

OTHER PUBLICATIONS

"Nokia Kinetic Is a Bendy Concept Phone," Luke Westaway, CNET, Oct. 27, 2011, pp. 1-2 http://www.cnet.com/news/nokia-kinetic-is-a-bendy-concept-phone/.

*Primary Examiner* — Adrian S Wilson
(74) *Attorney, Agent, or Firm* — Larson Newman, LLP (57) ABSTRACT

An information handling system may be in the form of a tablet computer such as a tablet computer. The tablet computer has a bendable display and may be foldable about an axis to cause the display to be bended and form an outer surface of the folded tablet computer or portion thereof. When the tablet computer is folded, the bended display may be displaced relative to a portion of the housing of the tablet computer.

16 Claims, 11 Drawing Sheets

(56) References Cited

U.S. PATENT DOCUMENTS

| | | | |
|---|---|---|---|
| 2015/0103014 A1* | 4/2015 | Kim | G06F 3/03545 |
| | | | 345/173 |
| 2015/0241925 A1* | 8/2015 | Seo | G06F 1/1652 |
| | | | 361/679.27 |
| 2016/0048167 A1 | 2/2016 | Aurongzeb et al. | |
| 2016/0062408 A1* | 3/2016 | Lee | G06F 1/1641 |
| | | | 345/173 |

\* cited by examiner

FOLDING COMPUTING DEVICE WITH BENDING DISPLAY

FIELD OF THE DISCLOSURE

The present disclosure generally relates to information handling systems, and more particularly relates to a folding computing device with bending display.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures.

SUMMARY

An information handling system such as a tablet computer has a flexible display and may be foldable about an axis to cause the display to bend and form an outer surface of the folded tablet computer. When the tablet computer is folded, the bent display may be displaced relative to a portion of the housing of the tablet computer.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Information handling systems include computing devices such as tablet computers. Embodiments of tablet computers may fold. For example, a tablet computer may be hinged and fold. Organic light-emitting diodes (OLED) have been developed that may be formed into a sheet of OLEDs to form an OLED display. Embodiments of OLED displays may be flexible such that the displays may bend or be bendable, and may have a fairly static area. Flexible OLED displays may be used to provide an integrated display for tablet computers.

When a flexible OLED display is integrated into a folding tablet computer to provide an integrated display for the folding tablet computer, the OLED display may be positioned on the folding tablet device such that the OLED display bends or folds when the tablet computer is folded. Because the OLED display may have a relatively static area, when the display is bent to be folded about an axis, there may be a need for the OLED display to be displaced relative to a portion of the body or housing of the folding tablet computer.

Figure 1:
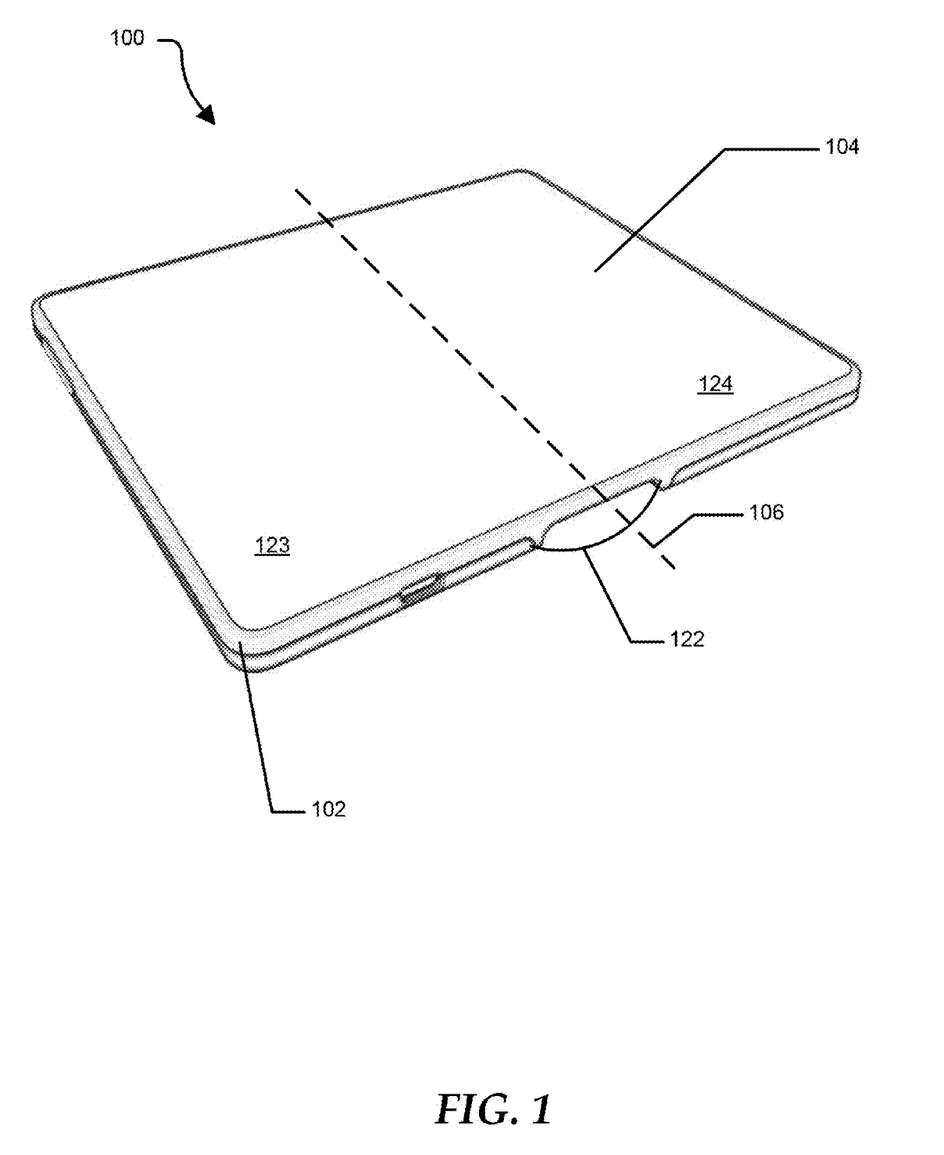
FIG. 1 is a perspective view of a folding tablet computer, according to an embodiment of the present disclosure.

FIG. 1 illustrates an embodiment of a folding tablet computer 100. Folding tablet computer 100 includes a housing 102 forming the body of folding tablet computer 100 and a flexible OLED display 104 coupled to housing 102 to provide an integrated display for folding tablet computer 100. As can be seen from FIG. 1, display 104 spans a surface of folding tablet computer 100. Folding tablet computer 100 folds along axis 106 such that flexible OLED display 104 is bent and folded. In one embodiment, folding tablet computer 100 folds such that flexible OLED display 104 is on the outer surface of folded tablet computer 100.

When folding tablet computer 100 is folded such that flexible OLED display 104 is on the outer surface of folded tablet computer 100, because flexible OLED display 104 has relatively static area, flexible OLED display 104 will be displaced relative to housing 102.

In embodiments, flexible OLED display 104 may have touch detection capabilities such that flexible OLED display 104 provides a touch-screen interface for tablet computer 100. For example, flexible OLED display 104 may include in-cell touch technology to allow for touch detection and registration. Flexible OLED display 104 may include one or more layers providing touch detection and registration. OLED display 104 may provide a user interface for interacting with device 100.

In embodiments, housing 102 may be a foldable housing assembly with a hinged spine 122 mechanically coupling first and second housing portions (123, 124, respectively) in opposition such that the first and second housing portions (123, 124) may be folded towards each other to fold folding tablet computer 100. First and second housing portions (123, 124) may be considered housing wings, or first and second wings (123, 124, respectively). Thus first wing 123 is hingedly coupled to second wing 124 in opposition by hinged spine 122 such that wings 123 and 124 may be folded together along folding axis 106 provided by hinged spine 122 such that folding tablet computer 100 may be folded.

Wings 123 and 124 may include a computing apparatus such as a computer motherboard for folding tablet computer 100. While wings 123 and 124 are shown as being roughly symmetric in size, this is by way of exposition, not limitation, and wings 123 and 124 may be of different sizes or areas. As can further be seen from FIG. 1, display 104 spans portions of both wings 123 and 124: because display 104 is flexible and bendable, display 104 may be folded along folding axis 106 provided by hinged spine 122 when wings 123 and 124 are folded together. While display 104 is shown as spanning substantially all of a surface of hinged spine 122 and both wings 123 and 124, this is by way of illustration, not limitation, and display 104 may span a smaller area of wings 123 and 124 so long as display 104 spans a portion of hinged spine 122, and wings 123 and 124 as a contiguous area such that when wings 123 and 124 are folded together, display 104 bends and folds along folding axis 106 provided by hinged spine 122.

Figure 2:
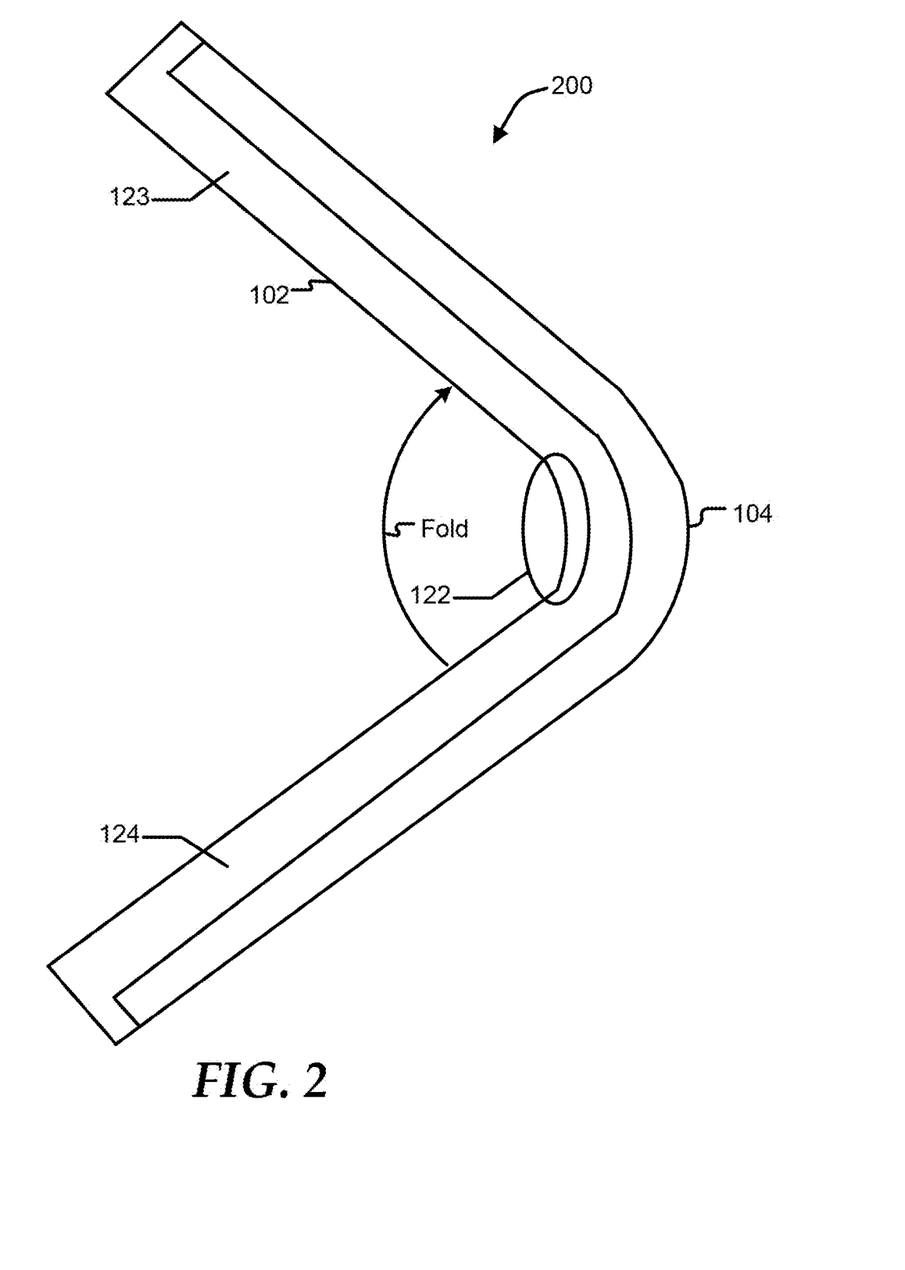
FIG. 2 is an illustration of a folding tablet computer, according to an embodiment of the present disclosure.

FIG. 2 illustrates an embodiment of a folding tablet computer 200, which may be similar to or the same as folding tablet computer 100, while being folded. Folding tablet computer 200 includes a housing 102 and a flexible OLED display 104. As can be seen from FIG. 2, folding tablet computer 200 is folding into a folded position such that flexible OLED display 104 is bent to form an outer surface of folding tablet computer 200 when folding tablet computer 200 is in the folded position. Because flexible OLED display 104 is relatively static in area, at least a portion of flexible OLED display 104 will be displaced relative to housing 102 during the folding of tablet computer 200. The displacement may be asymmetric and flexible OLED display 104 may be primarily displaced relative to one side or portion of housing 102. The displacement of flexible OLED display 104 may be symmetric and flexible OLED display 104 may be displaced generally symmetrically relative to each side or portion of housing 102.

More particularly, wings 123 and 124 are folded and bend toward each other with hinged spine 122 providing the folding axis. As can further be seen from FIG. 2, display 104 is bent in proximity to hinged spine 122.

Figure 3:
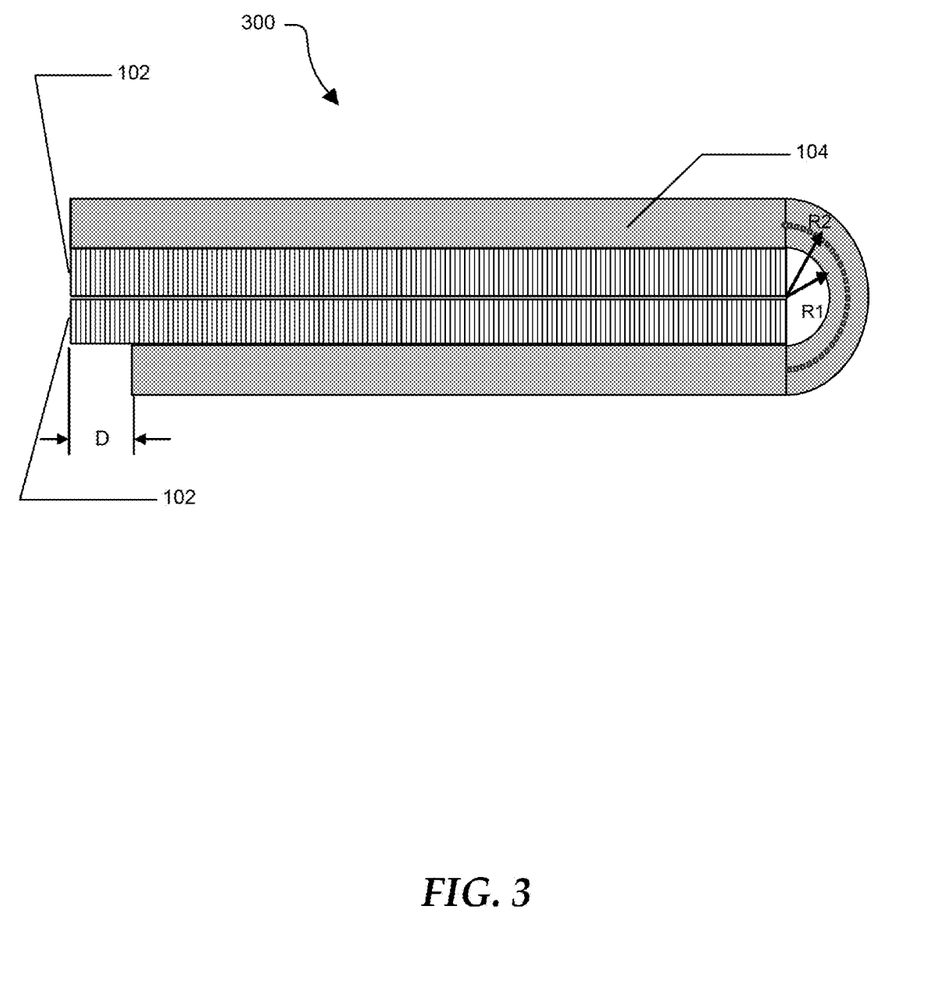
FIG. 3 is an illustration of a folding tablet computer, according to an embodiment of the present disclosure.

FIG. 3 illustrates an embodiment of a folding tablet computer 300, which may be similar to or the same as folding tablet computer 100 or 200, when folded. As can be seen from FIG. 3, folding tablet computer 300 is folded into a folded position such that flexible OLED display 104 is bent to form an outer surface of folding tablet computer 300. As can further be seen from FIG. 3, folding tablet computer 300 illustrates a generally asymmetric displacement of flexible OLED display 104 relative to housing 102. More particularly, because flexible OLED display 104 is relatively static in area, display 104 is displaced relative to one side of housing 102 by a displacement D as shown in FIG. 3. Displacement D is determined by a thickness of display 104 and a relative arc of bend of display 104. For example, displacement D depends on a differential between an interior bend radius (shown as R1) and a central bend radius (shown as R2) of OLED display 104.

Thus, displacement D may be defined as $$D=\pi R2-\pi R1,\qquad\text{EQ. 1}$$

where R1 is the interior bend radius of the folded OLED display 104 and R2 is the central bend radius of OLED display 104.

As discussed above, FIG. 3 illustrates an embodiment of a folding tablet computer 300 with asymmetric displacement of flexible OLED display 104 relative to housing 102 such that the displacement D is in regard to one side of folding tablet computer 300 when tablet computer 300 is folded. In different configurations or embodiments, displacement of flexible OLED display 104 relative to housing 102 may be (generally) symmetric such that displacement occurs in regard to both sides of folding tablet computer 300 when tablet computer 300 is folded. In such a configuration or embodiment, instead of a displacement D of display 104 being with regard to one side of tablet computer 300, display 104 may be displaced by D/2 with regard to each side of tablet computer 300 for a compounded displacement D.

Figure 4:
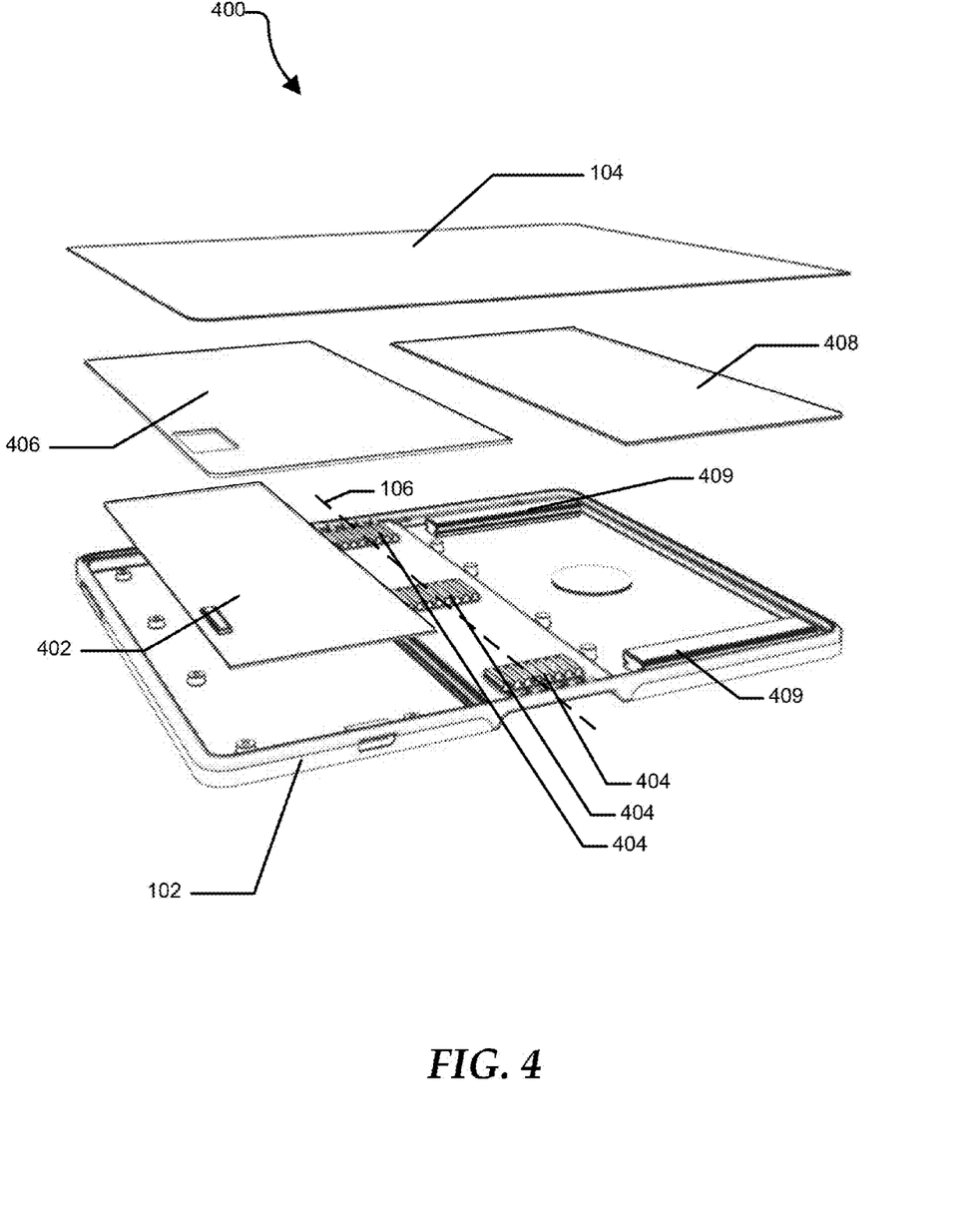
FIG. 4 is an exploded perspective view of a folding tablet computer, according to an embodiment of the present disclosure.

FIG. 4 illustrates an embodiment of a folding tablet computer 400 configured for asymmetric displacement of flexible OLED display 104 relative to housing 102. Folding tablet computer 400 includes a housing 102 and a flexible OLED display 104. Folding tablet computer 400 also includes motherboard 402, deformable display supports 404, fixed support plate 406, sliding support plate 408, and linear guides 409. Motherboard 402 provides computing logic for tablet computer 400 and may include processor and memory components or devices. Motherboard 402 may be coupled to flexible OLED display 104 with a bus connection (not shown) and may provide images to be displayed on display 104 and may receive input from display 104. Deformable display supports 404 support display 104 in proximity to the folding axis of folding tablet computer 400. Fixed support plate 406 is fixedly coupled to housing 102 and is further coupled to and supports a portion of display 104. Sliding support plate 408 is slideably coupled to housing 102 via linear guides 409 and is further coupled to and supports a portion of display 104.

As can be seen from FIG. 4, linear guides 409 are arranged in parallel relative to each other. Furthermore, linear guides 409 are positioned with respect to housing 102 such that a displacement direction of a carriage sliding block as guided by the corresponding guide rail is perpendicular to folding axis 106 provided by the hinged spine of housing 102.

Figure 5:
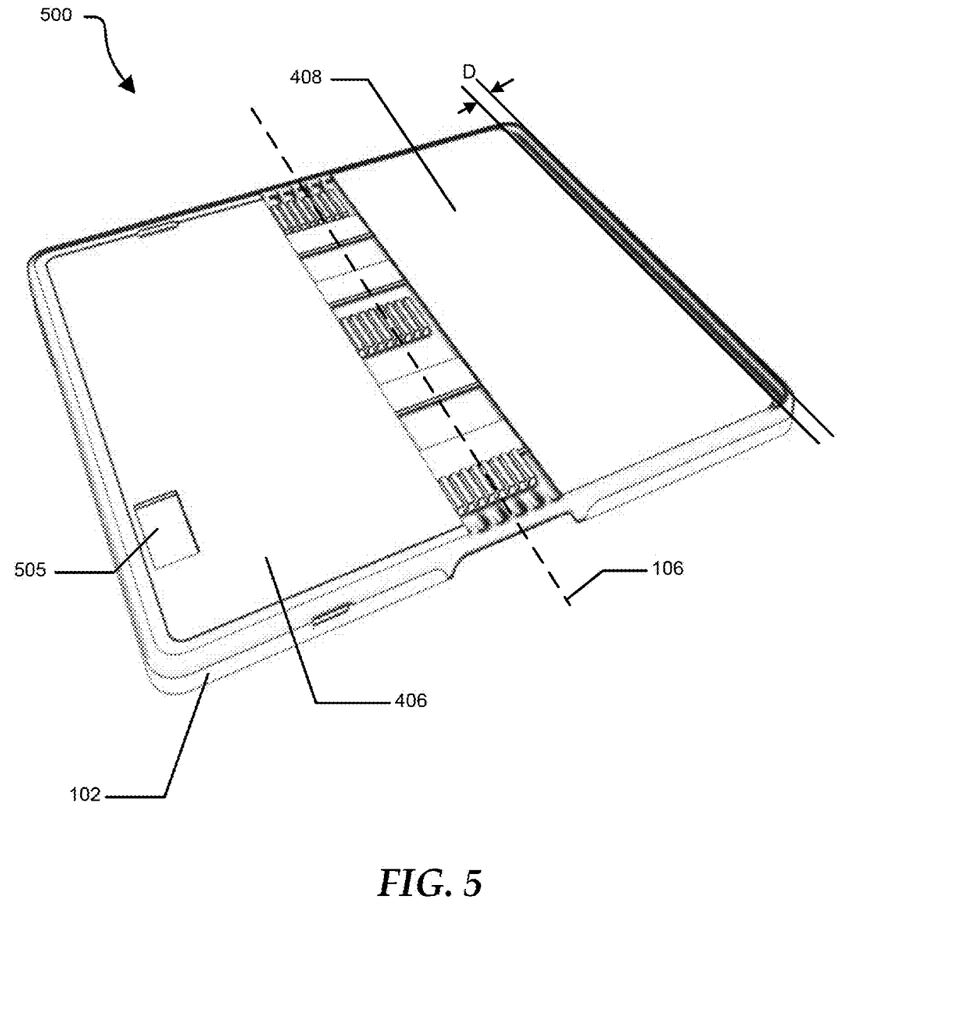
FIG. 5 is a perspective view of a folding tablet computer, according to an embodiment of the present disclosure.

FIG. 5 illustrates an embodiment of a folding tablet computer 500 configured for asymmetric displacement of a flexible OLED display relative to housing 102 which may be similar to or the same as folding tablet computer 400. In tablet computer 500, fixed support plate 406 is fixedly coupled to housing 102 and sliding support plate 408 is slideably coupled to housing 102 via a sliding mechanism such as linear guides 409 of FIG. 4. A flexible OLED display (not shown) such as display 104 of FIG. 4 would be fixedly coupled to both fixed support plate 406 and sliding support plate 408 such that when folding tablet computer 500 is folded about folding axis 106, sliding support plate 408 and thus the display will be asymmetrically displaced by displacement D (shown) with regard to one side or portion of the housing. As discussed above, folding tablet computer 500 is folded such that the display (not shown) will be on the outer fold and form the outer surface of folding tablet computer 500.

As further shown in FIG. 5, there may be a connection ablation 505 formed in fixed support plate 406 to allow for connection between the motherboard and the display of folding tablet computer 500. Such a connection may use a deformable ribbon bus to connect the motherboard and the display. In a configuration of symmetric displacement of a display relative to a housing (not shown), the deformable ribbon bus may allow for a limited displacement of the display relative to the motherboard due to folding and unfolding of the folding tablet computer.

Figure 6:
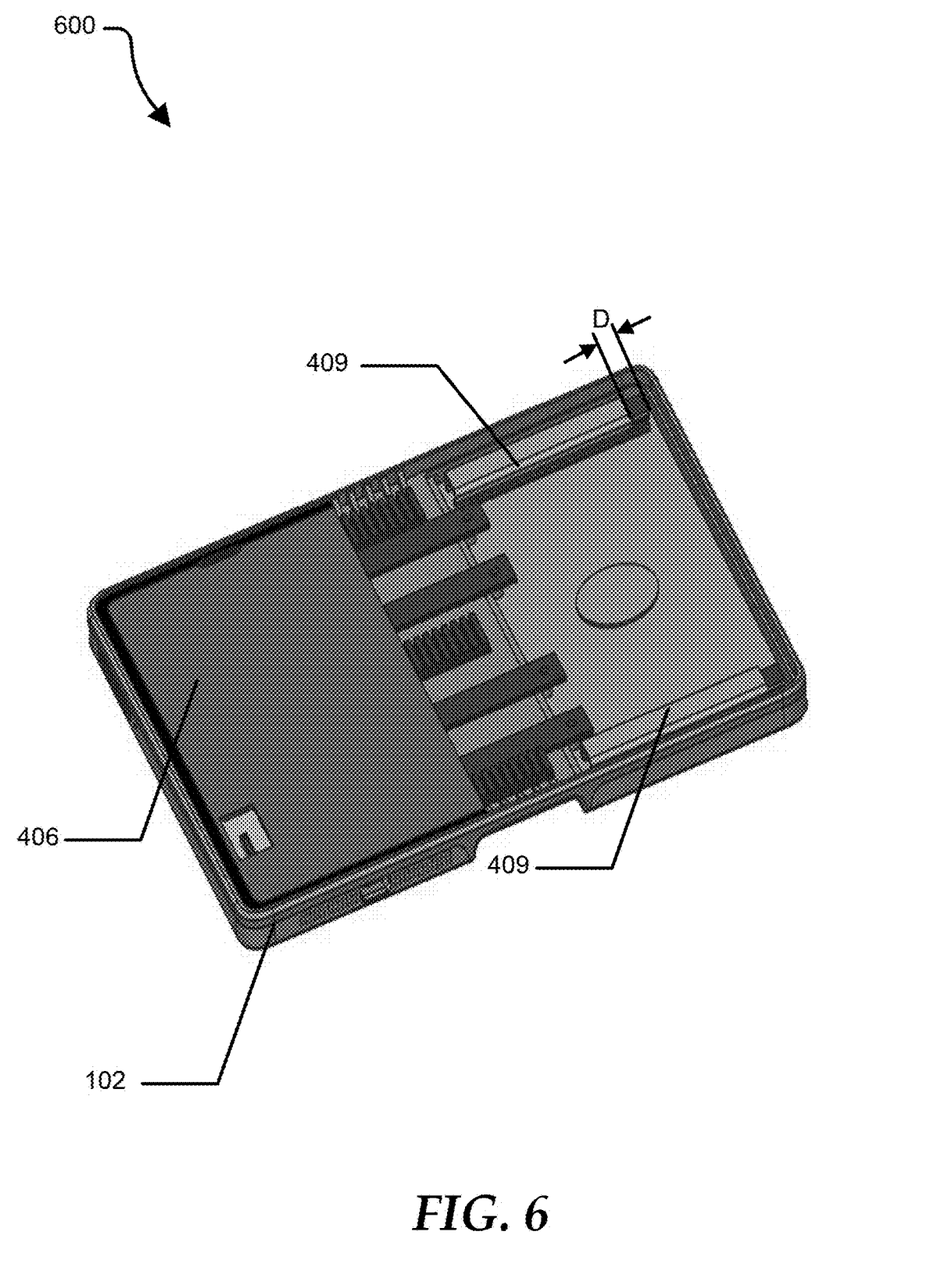
FIG. 6 is a perspective view of a folding tablet computer, according to an embodiment of the present disclosure.

FIG. 6 illustrates an embodiment of a folding tablet computer 600 configured for asymmetric displacement of a flexible OLED display relative to housing 102 which may be similar to or the same as folding tablet computer 500. FIG. 6 illustrates housing 102 fixedly coupled to fixed support plate 406. Housing 102 is further fixedly coupled to guide rails of linear guides 409 and guide rails of linear guides 409 are positioned in parallel to allow the respective carriage slide blocks of linear guides 409 to move linearly relative to housing 102 to allow a sliding support plate (not shown) coupled to carriage slide blocks of linear guides 409 to be displaced linearly relative to housing 102. Thus, carriage slide blocks of linear guides 409 will be ultimately coupled to a side of the display via the sliding support plate to allow a side or portion of the display to be linearly displaced relative to housing 102 when folding tablet computer 600 is folded. FIG. 6 illustrates a relative displacement D of the carriage slide blocks relative to the guide rails of linear guides 409.

Figure 7A:
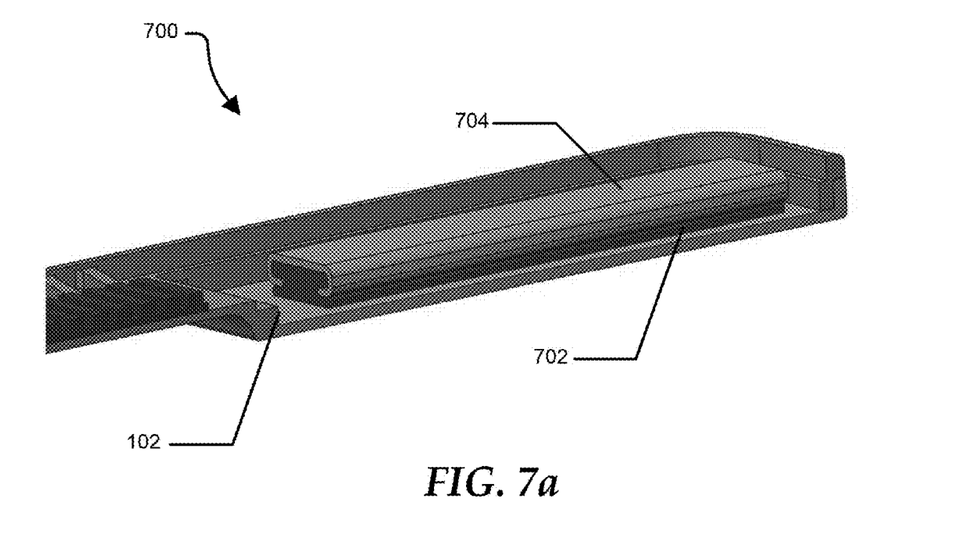
FIGS. 7a and 7b are perspective views of a linear guide, according to an embodiment of the present disclosure.
Figure 7B:
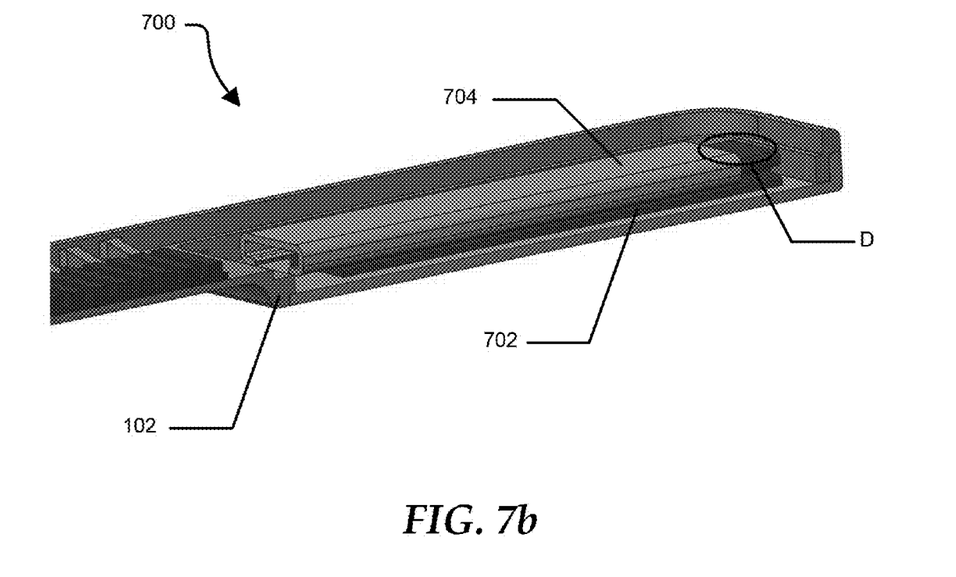

FIGS. 7a and 7b illustrate an embodiment of a linear guide 700 that may be used in embodiments of a folding tablet computer to allow for displacement of the display of the folding tablet computer when the folding tablet computer is folded or unfolded. Linear guide 700 includes guide rail 702 and carriage sliding block 704. As shown, guide rail 702 may be fixedly coupled to a housing. Carriage sliding block 704 may be fixedly coupled to a display, for example, via coupling to a sliding support plate. As can be seen from FIGS. 7a and 7b, carriage sliding block 704 is engaged with guide rail 702, and carriage sliding block 704 may be slideably displaced, as shown by displacement D in FIG. 7b, with regard to guide rail 702.

Figure 8:
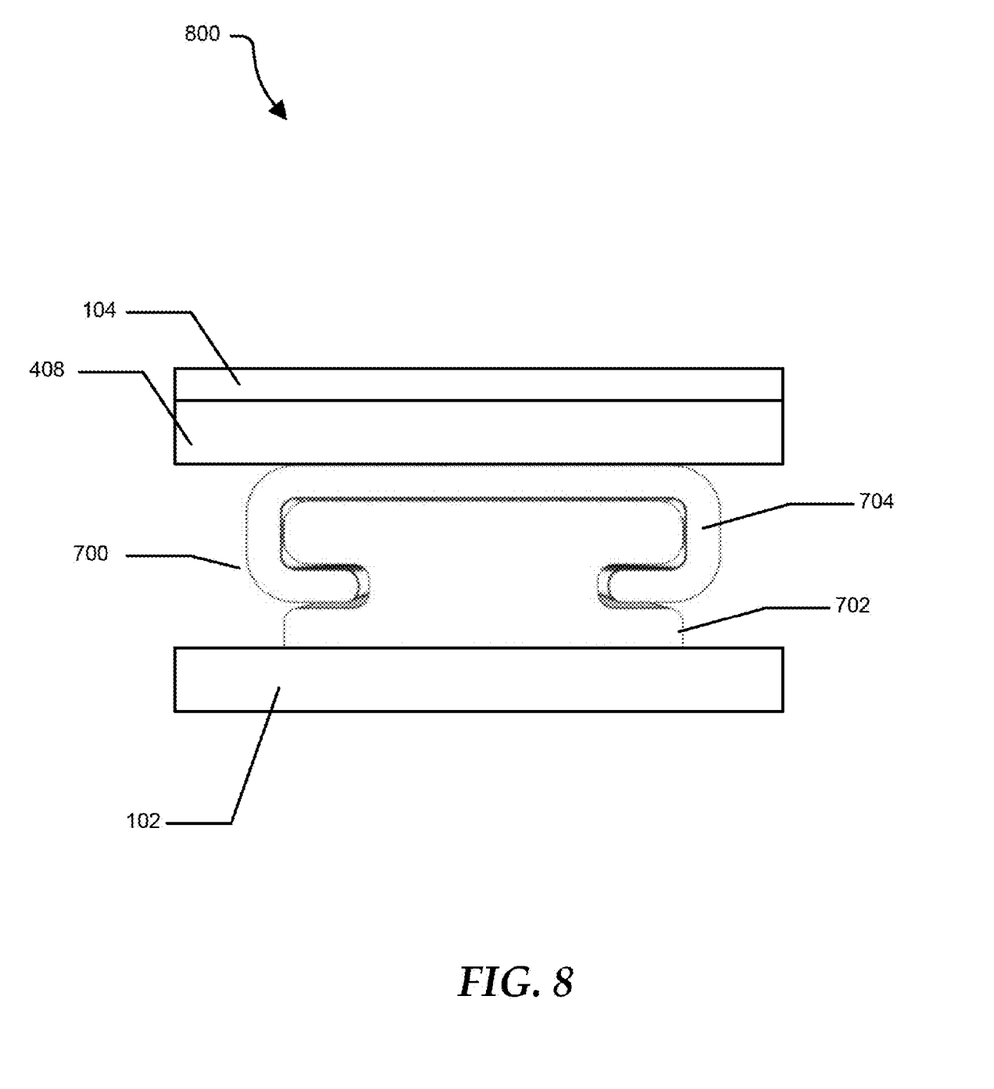
FIG. 8 is an illustration of a portion of a folding tablet computer, according to an embodiment of the present disclosure.

FIG. 8 illustrates an application of linear guide 700 in a folding tablet computer to allow for slideable displacement of a display. In FIG. 8, carriage sliding block 704 is engaged with guide rail 702, forming linear guide 700. Guide rail 702 is fixedly coupled to housing 102 and carriage sliding block 704 is fixedly coupled to sliding support plate 408. Because carriage sliding block 704 may be linearly displaced with regard to guide rail 702, sliding support plate 408 may be linearly displaced with regard to housing 102 as directed by linear guide 700. Sliding support plate 408 is coupled to display 104 such that display 104 may also be slideably displaced relative to housing 102.

While in FIG. 8, the guide rail is coupled to the housing and the carriage sliding block to the display, this is by way of example, and in embodiments, the carriage sliding block may be coupled to the housing and the guide rail coupled to the display.

Figure 9:
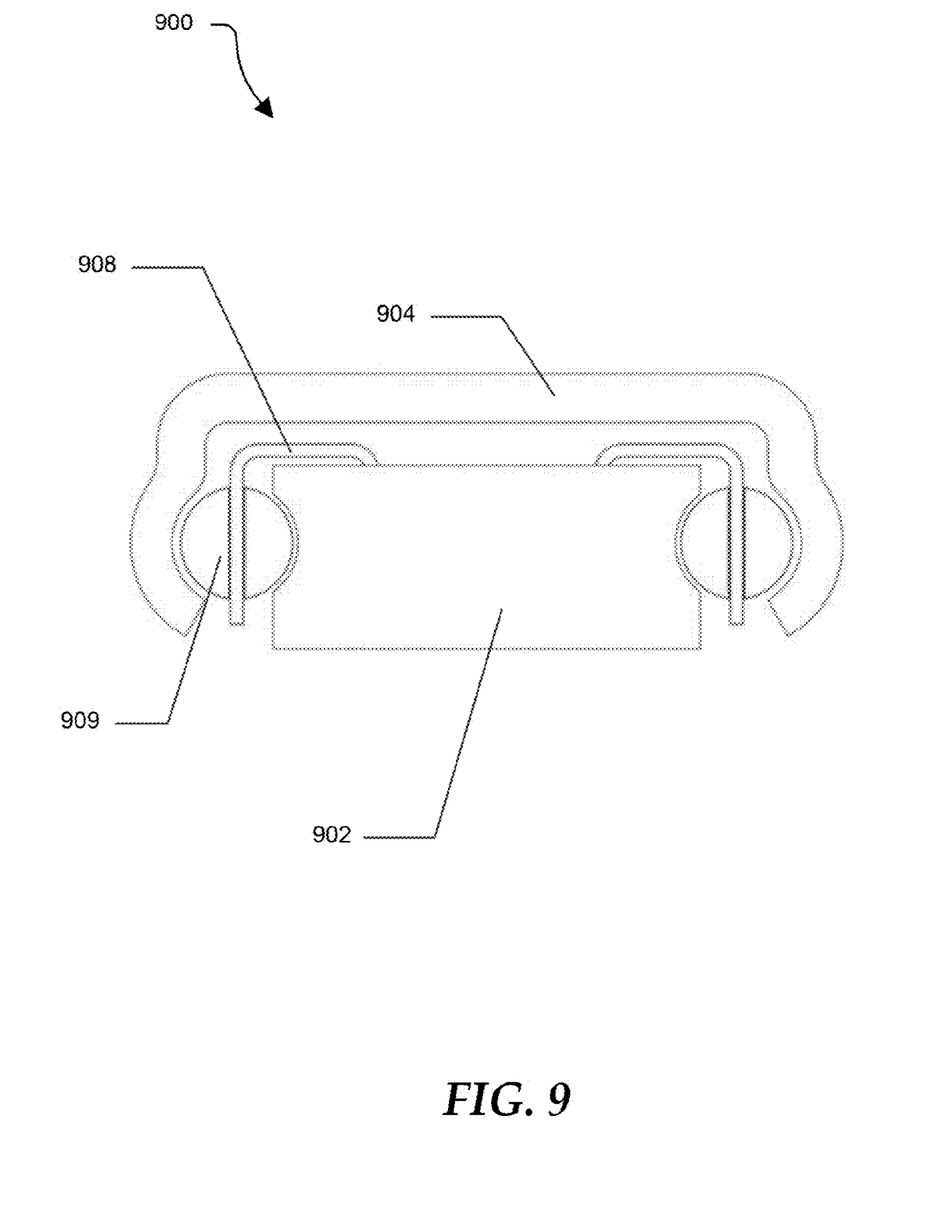
FIG. 9 is an illustration of a linear guide, according to an embodiment of the present disclosure.

FIG. 9 illustrates an embodiment of a linear guide 900 that may be used in embodiments of a folding tablet computer to allow for displacement of the display of the folding tablet computer when the folding tablet computer is folded or unfolded. Linear guide 900 includes guide rail 902 and carriage sliding block 904. Linear guide 900 may have bearings 909 facilitating displacement of carriage sliding block 904 with regard to guide rail 902. Bearings 909 may be held in position by bearing retaining element 908. Guide rail 902 may be fixedly coupled to a housing. Carriage sliding block 904 may be fixedly coupled to a display, for example, via coupling to a sliding support plate.

Figure 10:
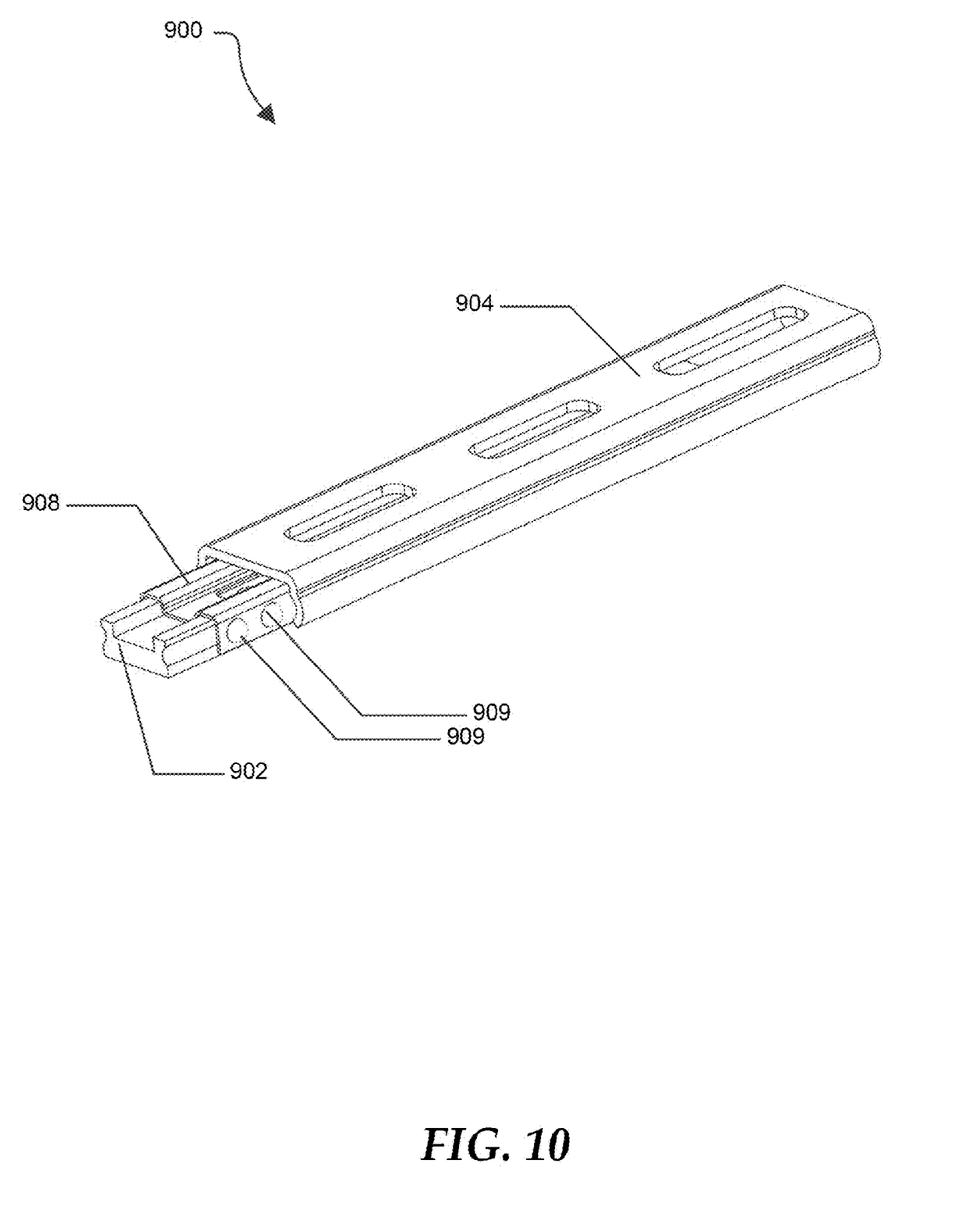
FIG. 10 is a perspective view of a linear guide, according to an embodiment of the present disclosure.

FIG. 10 illustrates a further view of linear guide 900. As can be seen in FIG. 10, carriage sliding block 904 is engaged with guide rail 902 and is displaced with regard to guide rail 902. Bearings 909 are retained by bearing retaining element 908 and facilitate displacement of carriage sliding block 904 with regard to guide rail 902. While particular examples of linear guides are shown and discussed, this is by way of exposition, not limitation, and linear guides may take any number of forms or shapes and may be linear bearings. Guide rails or portions thereof may be metal or plastic. Carriage sliding blocks or portions thereof may be polymer or metal. A linear guide may have ball bearings interposed between the guide rail and carriage sliding block. One or more carriage sliding block(s) may be used with a single guide rail. While the above has been discussed with two linear guides, a folding tablet computer may have any number of linear guides allowing for displacement of a display. A linear guide may have a stop mechanism controlling the amount of displacement of a carriage sliding block relative to the guide rail. The stop mechanism may be used to control relative displacement of a display in a direction.

Figure 11:
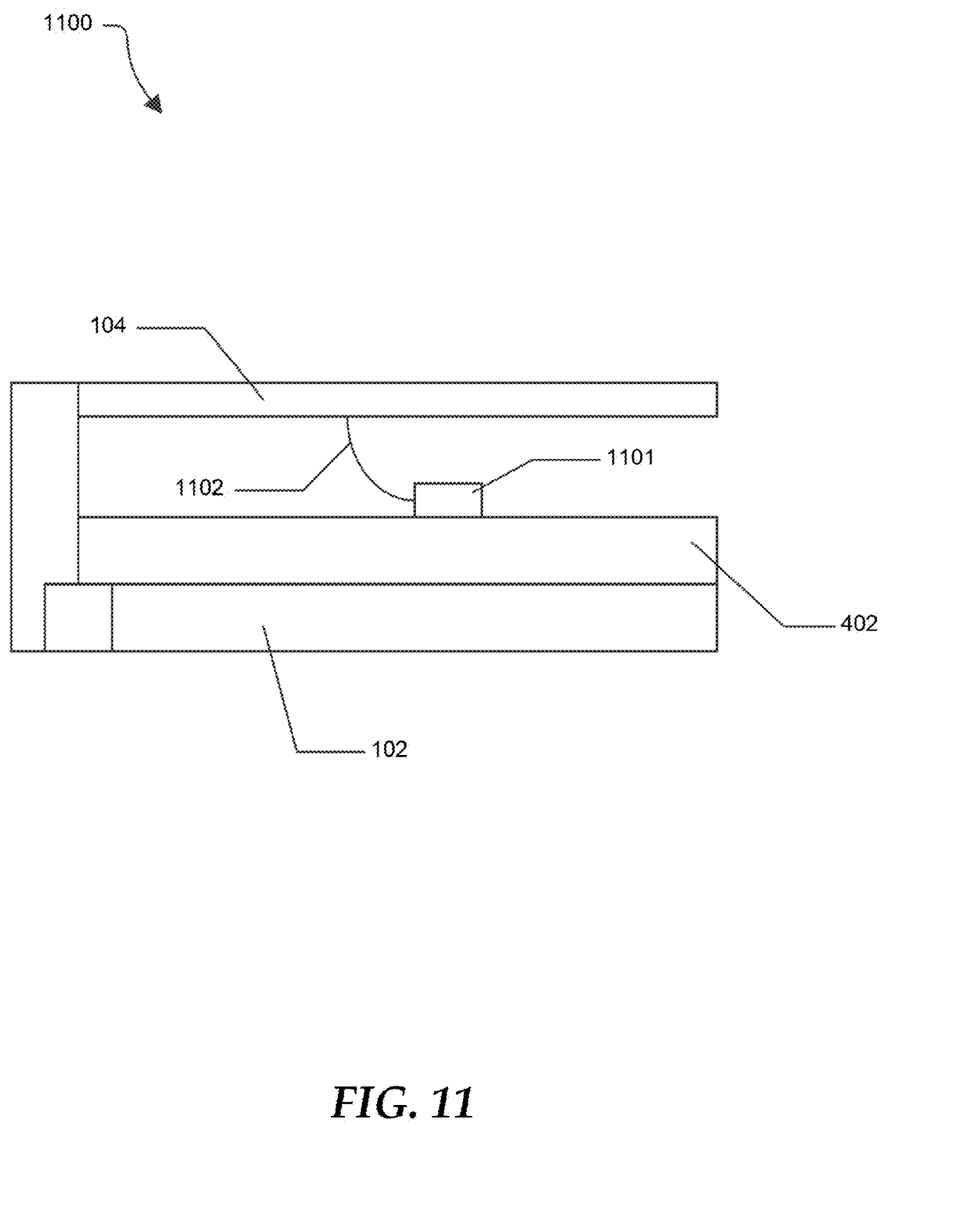
FIG. 11 is an illustration of a portion of a folding tablet computer, according to an embodiment of the present disclosure.

FIG. 11 illustrates a portion 1100 of an embodiment of a folding tablet computer illustrating the connection between motherboard and display. Portion 1100 includes a housing portion 102 and a display portion 104. Motherboard 402 is fixedly coupled to housing 102. Motherboard 402 includes a bus connection 1101 coupled to a deformable ribbon-bus 1102 which is connected to display 104. In the event that display 104 is displaced relative to motherboard 402, for example, because display 104 is symmetrically displaceable, bus 1102 may be of a length to accommodate the relative displacement of display 104 with regard to housing 102. The connection of the bus to the display may be integrally fused.

While linear guides have generally, in the above, been discussed with regard to asymmetric displacement of a foldable display relative to a housing, this is by way of exposition. To implement generally symmetric displacement of a display relative to a housing in a folding tablet computer, two sliding plates may be used in conjunction with two sets of linear guides to allow for displacement of the display with regard to two opposing sides of a folding tablet computer, in much the same way that a sliding plate in conjunction with a set of linear guides allows for displacement of a portion of a display relative to a portion of the housing of a folding tablet computer.

An information handling system such as a folding tablet computer can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
   a foldable housing having first and second wings;
   a flexible display positioned on the housing to span a portion of the first and second wings;
   a sliding support plate slideably coupled to the foldable housing, the sliding support plate coupled to and supporting a portion of the flexible display spanning the portion of the second wing; and
   a linear guide displaceably coupling the flexible display and the sliding support plate to the second wing, wherein when the housing is folded, the sliding support plate and flexible display are displaced relative to the second wing and the flexible display forms an outer surface of the information handling system.

2. The information handling system of claim 1, wherein the first and second wings are coupled in opposition by a hinged spine providing a folding axis.

3. The information handling system of claim 1, wherein the linear guide comprises a guide rail and a respective carriage slide block mechanically engaged with the guide rail, wherein the carriage slide block is mechanically coupled to the sliding support plate and the guide rail is mechanically coupled to the second wing.

4. The information handling system of claim 1, further comprising a motherboard computing apparatus coupled to the first wing, and a bus coupling the motherboard computing apparatus to the flexible display.

5. The information handling system of claim 1, further comprising a fixed support plate fixedly coupled to the flexible display and fixedly coupled to the first wing to fixedly couple the flexible display to the first wing.

6. The information handling system of claim 2, further comprising a deformable display support supporting the flexible display in proximity to the folding axis.

7. A tablet computer comprising:
   a foldable housing having first and second wings;
   a flexible display positioned on the housing to span a portion of the first and second wings;
   a sliding support plate slideably coupled to the foldable housing, the sliding support plate coupled to and supporting a portion of the flexible display spanning the portion of the second wing; and
   a pair of linear guides arranged in parallel and displaceably coupling the sliding support plate and the flexible display to the second wing, wherein when the housing is folded, the sliding support plate and the flexible display are displaced relative to the second wing and the flexible display forms an outer surface of the tablet computer.

8. The tablet computer of claim 7, wherein the first and second wings are coupled in opposition by a hinged spine providing a folding axis.

9. The tablet computer of claim 7, wherein each linear guide of the pair of liner guides comprises a guide rail and a respective carriage slide block mechanically engaged with the guide rail, wherein the carriage slide block is mechanically coupled to the second wing and the guide rail is mechanically coupled to the sliding support plate.

10. The tablet computer of claim 7, further comprising a motherboard computing apparatus coupled to the first wing, and a bus coupling the motherboard computing apparatus to the flexible display.

11. The tablet computer of claim 7, further comprising a fixed support plate fixedly coupled to the flexible display and fixedly coupled to the first wing to fixedly couple the flexible display to the first wing.

12. The tablet computer of claim 7, wherein the flexible display is an OLED display.

13. A tablet computer comprising:
   a foldable housing with first and second wings;
   a flexible display positioned on the housing to span a portion of the first and second wings;
   a first sliding support plate slideably coupled to the foldable housing, the sliding support plate coupled to and supporting a portion of the flexible display spanning the portion of the first wing;
   a second sliding support plate slideably coupled to the foldable housing, the sliding support plate coupled to and supporting a portion of the flexible display spanning the portion of the second wing;
   a first pair of linear guides arranged in parallel and displaceably coupling the first sliding support plate and the flexible display to the first wing, wherein when the housing is folded, the first sliding support plate and the flexible display are displaced relative to the first wing and the flexible display forms an outer surface of the foldable information handling system; and
   a second pair of linear guides arranged in parallel and displaceably coupling the second sliding support plate and the flexible display to the second wing, wherein when the housing is folded, the second sliding support plate and the flexible display are displaced relative to the second wing and the flexible display forms an outer surface of the tablet computer.

14. The tablet computer of claim 13, wherein the first and second wings are coupled in opposition by a hinged spine providing a folding axis.

15. The tablet computer of claim 13, wherein each linear guide of the first and second pairs of liner guides comprises a guide rail and a respective carriage slide block mechanically engaged with the guide rail.

16. The tablet computer of claim 13, further comprising a motherboard computing apparatus coupled to the first wing, and a bus coupling the motherboard computing apparatus to the flexible display.

* * * * *